US012713508B2

(12) United States Patent
Ray et al.

(10) Patent No.: US 12,713,508 B2
(45) Date of Patent: Aug. 18, 2026

(54) METHOD AND DEVICE FOR LIGHT COMMISSIONING

(71) Applicant: SIGNIFY HOLDING B.V., Eindhoven (NL)

(72) Inventors: Manmath Nath Ray, Bangalore (IN); Sanjeev Kumar Puvvada Sathyanarayana, Bangalore (IN)

(73) Assignee: SIGNIFY HOLDING B.V., Eindhoven (NL)

( * ) Notice: Subject to any disclaimer, the term of this patent is extended or adjusted under 35 U.S.C. 154(b) by 64 days.

(21) Appl. No.: 18/874,829

(22) PCT Filed: Jun. 12, 2023

(86) PCT No.: PCT/EP2023/065644
§ 371 (c)(1),
(2) Date: Dec. 13, 2024

(87) PCT Pub. No.: WO2023/242118
PCT Pub. Date: Dec. 21, 2023

(65) Prior Publication Data

US 2025/0365841 A1 Nov. 27, 2025

(30) Foreign Application Priority Data

Jun. 15, 2022 (IN) ............................ 202241034398
Aug. 2, 2022 (EP) .................................... 22188305

(51) Int. Cl.
*H05B 47/19* (2020.01)
*H05B 47/175* (2020.01)

(52) U.S. Cl.
CPC ......... *H05B 47/19* (2020.01); *H05B 47/1985* (2024.01); *H05B 47/1995* (2024.01)

(58) Field of Classification Search
None
See application file for complete search history.

(56) References Cited

U.S. PATENT DOCUMENTS

2010/0271476 A1 10/2010 Damink et al.
2012/0068608 A1 * 3/2012 Covaro .................... G01J 3/50
250/201.1

(Continued)

*Primary Examiner* — Anh Q Tran

(57) ABSTRACT

A method (100) and a device (105) for commissioning a lighting system (110) arranged in an indoor space (120), wherein the lighting system comprises a plurality of light sources (130$a$-$e$), are provided. The method comprises the steps of iteratively defining a position, $P_i$, in the indoor space, setting the intensity level, $I_i$, of at least one light source in a subspace, $S_i$, comprising the position, $P_i$, to an intensity level value, measuring a light intensity, $I_{Li}$, in the position, $P_i$, and registering a relation between the measured light intensity, $I_{Li}$, in the position, $P_i$, and the measured light intensity, $I_{Li-1}$, in the position, $P_{i-1}$, to a path register (150). The method further comprises the step of creating a navigation path (160) in the indoor space based on the path register.

15 Claims, 4 Drawing Sheets

(56) References Cited

U.S. PATENT DOCUMENTS

| | | | |
|---|---|---|---|
| 2014/0327364 A1 | 11/2014 | Bischof et al. | |
| 2016/0227634 A1 | 8/2016 | Engelen et al. | |
| 2017/0160371 A1* | 6/2017 | Böckle | G01J 1/42 |
| 2020/0042006 A1 | 2/2020 | Jessen et al. | |
| 2021/0112647 A1* | 4/2021 | Coleman | G01S 17/42 |

* cited by examiner

METHOD AND DEVICE FOR LIGHT COMMISSIONING

CROSS-REFERENCE TO PRIOR APPLICATIONS

This application is the U.S. National Phase application under 35 U.S.C. § 371 of International Application No. PCT/EP2023/065644, filed on Jun. 12, 2023, which claims the benefit of Indian Patent application Ser. No. 202241034398, filed on Jun. 15, 2022 and European Patent Application No. 22188305.1, filed on Aug. 2, 2022. These applications are hereby incorporated by reference herein.

FIELD OF THE INVENTION

The present invention generally relates to light commissioning. More specifically, the present invention is related to a method and device for automatic commissioning of light sources.

BACKGROUND OF THE INVENTION

Commissioning of a lighting system encompasses control of the light sources of such a system. For example, commissioning may include grouping light sources, setting light intensities of the light sources, making the addresses of the different light sources known to a lighting system and/or a light system controller, etc.

Commissioning of an indoor lighting system of an office, industry, etc., may be relatively complex, especially for relatively large lighting systems comprising many light sources. The process of commissioning of lighting systems is non-trivial and may consider multiple parameters to provide a workable solution. Parameters that may need to be taken into account are the lighting system (comprising e.g. luminaires, sensors, controllers, gateways, software clients, software servers, etc.), the physical space of the site where the lighting system is to be commissioned, knowledge of the domain/space for accurate results and calibrations, etc. Due to the plurality of parameters, the process may be complex and or cumbersome. As a consequence, this may lead to errors and/or negative impacts on energy savings of the installed lighting system.

Furthermore, it should be noted that commissioning performed manually by one or more operators may even further contribute to the complexity and/or labor-intensiveness of the process.

Hence, it is an object of the present invention to provide an automatic commissioning method or process which may reduce the complexity related to time and/or effort for the commissioning.

US 2021/112647 A1 discloses a light emitting system comprising an angularly varying light emitting device (AVLED) which comprising one or more light sources, the AVLED operable to individually adjust light flux output from the one or more light sources into different angular bins in the environment; and a light sensor positioned to receive light from the environment, wherein light from the angularly varying light emitting device is cycled to emit light flux into different angular bins at different time periods, the light sensor is synchronized to capture first information related to light from the light flux reflected from the environment at the different time periods, and the angularly varying light emitting device adjusts the light flux output in different angular bins based on analysis of the first information received by the light sensor. The light sensor may be an imager and the AVLED may comprise a micro-LED array.

SUMMARY OF THE INVENTION

It is of interest to provide an automatic method or process for commissioning of a lighting system, which is convenient, non-complex, and efficient with respect to time and/or cost. This and other objects are achieved by providing a method and a device having the features in the independent claims. Preferred embodiments are defined in the dependent claims.

Hence, according to a first aspect of the present invention, there is provided a method for commissioning a lighting system arranged in an indoor space, wherein the lighting system comprises a plurality of light sources. The method comprises the step of defining a position, $P_0$, in the indoor space. The method further comprises the step of defining a subspace, $S_0$, of the indoor space comprising the position, $P_0$, wherein the subspace, $S_0$, comprises at least one light source of the plurality of light sources. The method further comprises the steps of setting the intensity level, $I_0$, of the at least one light source in the subspace, $S_0$, to an intensity level value, and measuring a light intensity, $I_{L0}$, in the position, $P_0$. The method further comprises the steps of, in an iterative manner from i=1, 2, . . . , to n, defining a position, $P_i$, in the indoor space, defining a subspace, $S_i$, of the indoor space comprising the position, $P_i$, wherein the subspace, $S_i$, comprises at least one light source of the plurality of light sources, setting the intensity level, $I_i$, of the at least one light source in the subspace, $S_i$, to an intensity level value, measuring a light intensity, $I_{Li}$, in the position, $P_i$, and registering a relation between the measured light intensity, $I_{Li}$, in the position, $P_i$, and the measured light intensity, $I_{Li-1}$, in the position, $P_{i-1}$, to a path register. The method further comprises creating a navigation path in the indoor space based on the path register.

According to a second aspect of the present invention, there is provided a device for commissioning a lighting system arranged in an indoor space, wherein the lighting system comprises a plurality of light sources. The device is configured to position itself in a position, $P_0$, in the indoor space, and determine a subspace, $S_0$, of the indoor space comprising the position, $P_0$, wherein the subspace, $S_0$, comprises at least one light source of the plurality of light sources. The device is further configured to set the intensity level, $I_0$, of the at least one light source in the subspace, $S_0$, to an intensity level value, and to measure a light intensity, $I_{L0}$, in the position, $P_0$. The device is further configured to, in an iterative manner from i=1, 2, . . . , to n, position itself in a position, $P_i$, in the indoor space,—determine a subspace, $S_i$, of the indoor space comprising the position, $P_i$, wherein the subspace, $S_i$, comprises at least one light source of the plurality of light sources, set the intensity level, $I_i$, of the at least one light source in the subspace, $S_i$, to a randomly selected intensity level value, measure a light intensity, $I_{Li}$, in the position, $P_i$, and register a relation between the measured light intensity, $I_{Li}$, in the position, $P_i$, and the measured light intensity, $I_{Li-1}$, in the position, $P_{i-1}$, to a path register. The device is further configured to navigate in the indoor space based on the path register.

Thus, the present invention is based on the idea of providing automatic commissioning of light sources in a lighting system, wherein the light intensities of the respective light sources are set, and measured, in an iterative manner. By registering the relations between the measured light intensities into a path register, a navigation path or "heat map" of the indoor space is created for navigation within the indoor space for purposes of maintenance, light source replacements, etc.

The present invention is advantageous in that the method implies an automatic commissioning of an indoor space or area in a convenient and efficient manner. It should be noted that commissioning of a lighting system performed manually by one or more operators may be complex and/or labor-intensive, whereas the method of the present invention overcomes these problems.

The present invention is further advantageous in that the method efficiently provides or creates a navigation path or "heat map" based on the measured lighting, such that the navigation path or "heat map" may be used (e.g. by the device of the second aspect of the present invention) for navigation in the indoor space. For example, via the navigation path, being associated with the logical locations of the light sources, the device may navigate in the indoor space for maintenance purposes (e.g. for replacement of one of more light sources) and/or as mentioned above for commissioning purposes.

There is provided a method for commissioning a lighting system arranged in an indoor space. By "indoor space", it is here meant substantially any indoor space such as a room, home, office, museum, store, etc. The lighting system comprises a plurality of light sources. It will be appreciated that the light sources may be any kind of light sources, e.g. comprising one of more light-emitting diodes (LEDs). The method comprises the steps of defining or determining a position, $P_0$, in the indoor space, i.e. a (initial or starting) position, and defining a subspace, $S_0$, of the indoor space comprising the position, $P_0$. By "subspace", it is here meant a three-dimensional (3D) (sub) space in the indoor space. The subspace, $S_0$, comprises at least one light source of the plurality of light sources. Hence, the subspace, $S_0$, is defined or determined such that it comprises one or more light sources. The method comprises setting the intensity level, $I_0$, of the at least one light source in the subspace, $S_0$, to an intensity level value. Hence, the light source(s) is (are) set to a respective (individual) intensity level value, or to a common intensity level value of the light source(s) in the subspace, $S_0$. The individual intensity light value or the common intensity level value may be different with respect to each other. The method further comprises measuring a light intensity, $I_{L0}$, in the position, $P_0$. The method further comprises performing steps in an iterative manner from i=1, 2, . . . , to n, i.e. in an iterative scheme or "loop" iterating a number of steps n times, comprising defining a position, $P_i$, in the indoor space, defining a subspace, $S_i$, of the indoor space comprising the position, $P_i$, wherein the subspace, $S_i$, comprises at least one light source of the plurality of light sources, setting the intensity level, $I_i$, of the at least one light source in the subspace, $S_i$, to an intensity level value, and measuring a light intensity, $I_{Li}$, in the position, $P_i$. Furthermore, within the iterative scheme or "loop" of the method, the method further comprises registering a spatial relation between the measured light intensity, $I_{Li}$, in the position, $P_i$, and the measured light intensity, $I_{Li-1}$, in the position, $P_{i-1}$, to a path register. By the term "relation", it is here meant any kind of relation, function, correspondence, or the like, between the measured light intensity, $I_{Li}$, in the position, $P_i$, and the measured light intensity, $I_{Li-1}$, in the position, $P_{i-1}$. For example, the relation, based on the light intensities, may in turn be a function and/or based on one or more parameters other than the light intensities, such as angle(s) to the light source(s), the shape of the subspace and/or indoor space, etc. The spatial relation may comprise the relationship between the spatial location of the measured light intensity, $I_{Li}$, in the position, $P_i$, and the measured light intensity, $I_{Li-1}$, in the position, $P_{i-1}$. In a simple example, the measured light intensity, $I_{Li}$, in the position, $P_i$ may be positioned left/right/up/down to the measured light intensity, $I_{Li-1}$, in the position, $P_{i-1}$. In a further advanced embodiment, the spatial relation may comprise a measure/relation of a distance and/or direction of the positions $P_i$ and $P_{i-1}$. In an example, the spatial relation comprises the relative position of the position $P_i$ with respect to the position $P_{i-1}$.

The light intensity relation(s) is (are) registered and/or saved by the method to a path register, wherein the path register may be provided substantially anywhere (on a server, device, etc.). The method further comprises creating a navigation path in the indoor space based on the path register. By the term "navigation path", it is here meant any path, map, or the like which may be used for navigation or orientation purposes. According to an alternative definition, the "navigation path" may constitute a "heat map" and/or a map as a function of lighting intensities. Once the method has created the navigation path, it may be used for different purposes. For example, the navigation path may be used for navigation or orientation within the indoor space for purposes of maintenance, light source replacements, etc.

According to an embodiment of the present invention, the step of setting the intensity level, $I_i$, of the at least one light source may comprise setting the intensity level, $I_i$, of the at least one light source in the subspace, $S_i$, to a randomly selected intensity level value. The embodiment is advantageous in that it may avoid any complexity in providing a predetermined scheme, table, or the like, for the setting of the intensity levels, $I_i$, of the light sources.

According to an embodiment of the present invention, the method may iteratively perform its steps until the intensity level, $I_i$, of each light source, respectively, of the plurality of light sources has been set. Hence, the method may continue its iterative commissioning operation until all light sources of the lighting system have been set to their respective intensity levels, $I_i$. The embodiment is advantageous in that it ensures a complete commissioning operation of the entire lighting system.

According to an embodiment of the present invention the position, $P_i$, the indoor space is at a floor level of the indoor space. Hence, the position, $P_i$, in which the respective light intensity, $I_{Li}$, is measured, is provided at a floor level of the indoor space.

According to an embodiment of the present invention, before the setting of the intensity level, $I_i$, of the at least one light source, one of the at least one light source is turned off, and the at least one light source is set to a predetermined intensity level, $I_P$, is fulfilled. In other words, before the commissioning operation, one or more of the light sources may be turned off or set to a predetermined intensity level, $I_P$.

According to an embodiment of the present invention, the device may be configured to set the intensity level, $I_i$, of the at least one light source in the subspace, $S_i$, to a randomly selected intensity level value.

According to an embodiment of the present invention, the device may set the intensity level, $I_i$, of each light source of the plurality of light sources. Hence, the device may continue its commissioning operation within the indoor space until all light sources of the lighting system have been set to their respective intensity levels, $I_i$. The embodiment is advantageous in that the device ensures a complete commissioning operation of the entire lighting system.

According to an embodiment of the present invention, the device may comprise the path register, and a processor communicatively coupled to the path register, the device further being configured to, via the processor, navigate in the indoor space based on the path register. The embodiment is advantageous in that the device, by comprising the path register itself, may perform the commissioning and/or navigation independently.

According to an embodiment of the present invention, the device may comprise at least one of at least one light sensor, at least one camera, and at least one interface, configured to measure the light intensity, $I_{Li}$. In other words, the device may comprise one or more light sensor(s), camera(s) and/or interface(s) configured to measure the light intensity, $I_{Li}$. The embodiment is advantageous in that the sensor(s), camera(s) and/or interface(s) may conveniently measure the light intensity, $I_{Li}$, in the indoor space.

According to an embodiment of the present invention, the device may comprise at least one interface configured to set the intensity level, $I_i$, of the at least one light source in the subspace, $S_i$. For example, the interface(s) may be configured to set the intensity level, $I_i$, to a randomly selected intensity level value. The embodiment is advantageous in that the device may conveniently and efficiently set the light source intensity levels, $I_i$.

According to an embodiment of the present invention, the device comprises a set of wheels, and a drive unit coupled to the set of wheels, whereby the device is configured to position itself in the indoor space via the wheels and the drive unit. The embodiment is advantageous in that the device may easily move on the floor of the indoor space and perform the commissioning of the lighting system.

According to an embodiment of the present invention, there is provided a commissioning arrangement. The commissioning arrangement comprises a lighting system arranged in an indoor space, wherein the lighting system comprises a plurality of light sources, and a device according to any one of the previously described embodiments.

According to an embodiment of the present invention, the commissioning arrangement may further comprise a wireless communication system, wherein the device is connected to the wireless communication system. The embodiment is advantageous in that the device may efficiently communicate with and/or via the wireless communication system for any sending of information. For example, the device may be connected to the Internet via the wireless communication system. Furthermore, the device may save data and/or access data related to the path register and/or registration path via the wireless communication system.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
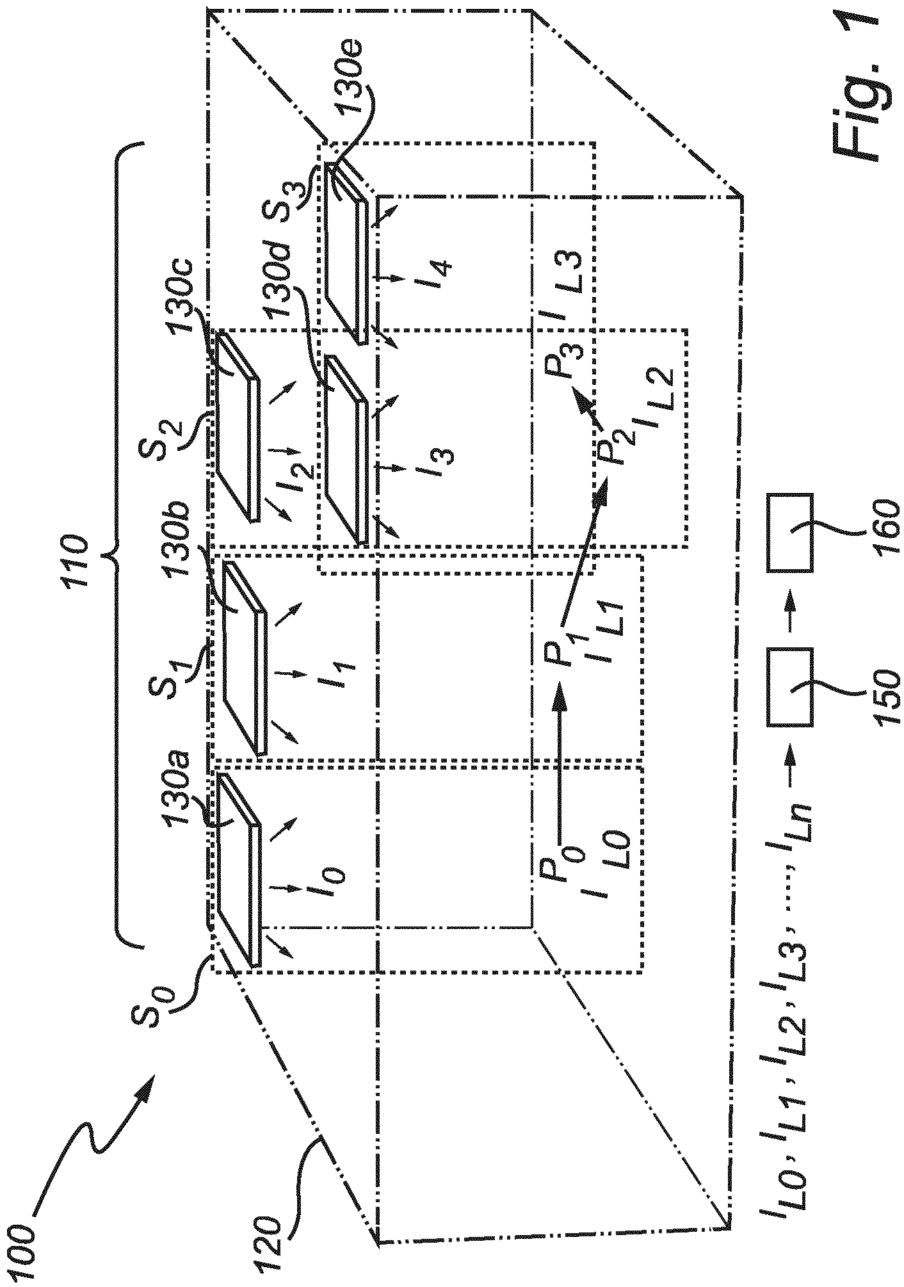
FIG. 1 schematically shows a method for commissioning a lighting system according to an exemplifying embodiment of the present invention, FIGS. 2 and 3 schematically disclose a device for commissioning a lighting system according to exemplifying embodiments of the present invention, and FIG. 4 schematically shows a commissioning arrangement according to an exemplifying embodiment of the present invention.

FIG. 1 schematically shows a method 100 for commissioning a lighting system 110 arranged in an indoor space 120, according to an exemplifying embodiment of the present invention. The indoor space 120 may be substantially any space such as a home, an office, a store, an industry site, a museum, etc. Furthermore, the indoor space 120 may have substantially any shape regarding ceiling height, isle(s), etc. The lighting system 110 arranged in the indoor space 120 comprises a plurality of light sources 130*a-e*. The size, shape, positioning and/or number of light sources 130*a-e* is arbitrary. In FIG. 1, the light sources 130*a-e* are exemplified as being provided in the ceiling of the indoor space 120.

The method 100 comprises the step of defining a position, $P_0$, in the indoor space 120. The method 100 further comprises the step of defining a subspace, $S_0$, of the indoor space 120 comprising the position, $P_0$, wherein the subspace, $S_0$, comprises at least one light source 130*a* of the plurality of light sources 130*a-e*. The defining or determining of the subspace, $S_0$, may be made in different ways. For example, a (predetermined) radius may be determined from the position, $P_0$, in order to define the subspace, $S_0$. Here, the (initial) subspace, $S_0$, is defined as a parallelepiped, and it is exemplified that the subspace, $S_0$, comprises a (single) light source 130*a*.

The method 100 further comprises the step of setting the intensity level, $I_0$, of the (at least one) light source 130*a* in the subspace, $S_0$, to an intensity level value, and measuring a light intensity, $I_{L0}$, in the position, $P_0$. Hence, this may be interpreted as an initial step or part of the commissioning of the method 100. The method 100 further comprises performing steps in an iterative manner from i=1, 2, . . . , to n, comprising defining a position, $P_i$, in the indoor space, and defining a subspace, $S_i$, of the indoor space 120 comprising the position, $P_i$, wherein the subspace, $S_i$, comprises at least one light source of the plurality of light sources 130*a-e*, setting the intensity level, $I_i$, of the at least one light source in the subspace, $S_i$, to an intensity level value, and measuring a light intensity, $I_{Li}$, in the position, $P_i$. For example, the step of defining the position, $P_i$, may include defining a random position, $P_i$, in the indoor space 120. As exemplified in FIG. 1, these steps comprise defining a subspace, $S_1$, of the indoor space 120 comprising the position, $P_1$, wherein the subspace, $S_1$, comprises light source 130*a*, setting the intensity level, $I_1$, of light source 130*a* in the subspace, $S_1$, to an intensity level value, and measuring the light intensity, $I_{L1}$, in the position, $P_1$. The step of setting the intensity level, $I_i$, of the at least one light source may comprise setting the intensity level, $I_i$, of the at least one light source 130*a-e* in the subspace, $S_i$, to a randomly selected intensity level value. Alternatively, the setting of the intensity level, $I_i$, of the at least one light source in the subspace, $S_i$, may be performed according to a predetermined scheme. For example, the intensity level, $I_i$, of the light source(s) 130*a-e* may be set to a predetermined percentage or level of the maximum output, e.g. 50%.

Accordingly, by following the example of FIG. 1, the subspaces, $S_2$, $S_3$, are defined, comprising positions, $P_2$, $P_3$, wherein the respective light sources 130*c* of subspace, $S_2$, and light sources 130*d,e*, of subspace, $S_3$, are set to intensity levels, $I_2$, $I_3$, $I_4$, respectively. This iterative feature of the method 100 may be performed until the intensity level, $I_i$, of each light source 130*a-e*, respectively, of the plurality of light sources has been set. Alternatively, the number of iterations, i.e. the number/integer, n, may be set in advance.

The method 100 further comprises the step of registering a (spatial) relation between the measured light intensity, $I_{Li}$, in the position, $P_i$, and the measured light intensity, $I_{Li-1}$, in the position, $P_{i-1}$, to a path register 150. It will be appreciated that the path register 150 may be provided anywhere, such as on an (external) server. The method 100 further comprises creating a navigation path 160 in the indoor space 120 based on the path register 150.

Figure 2:
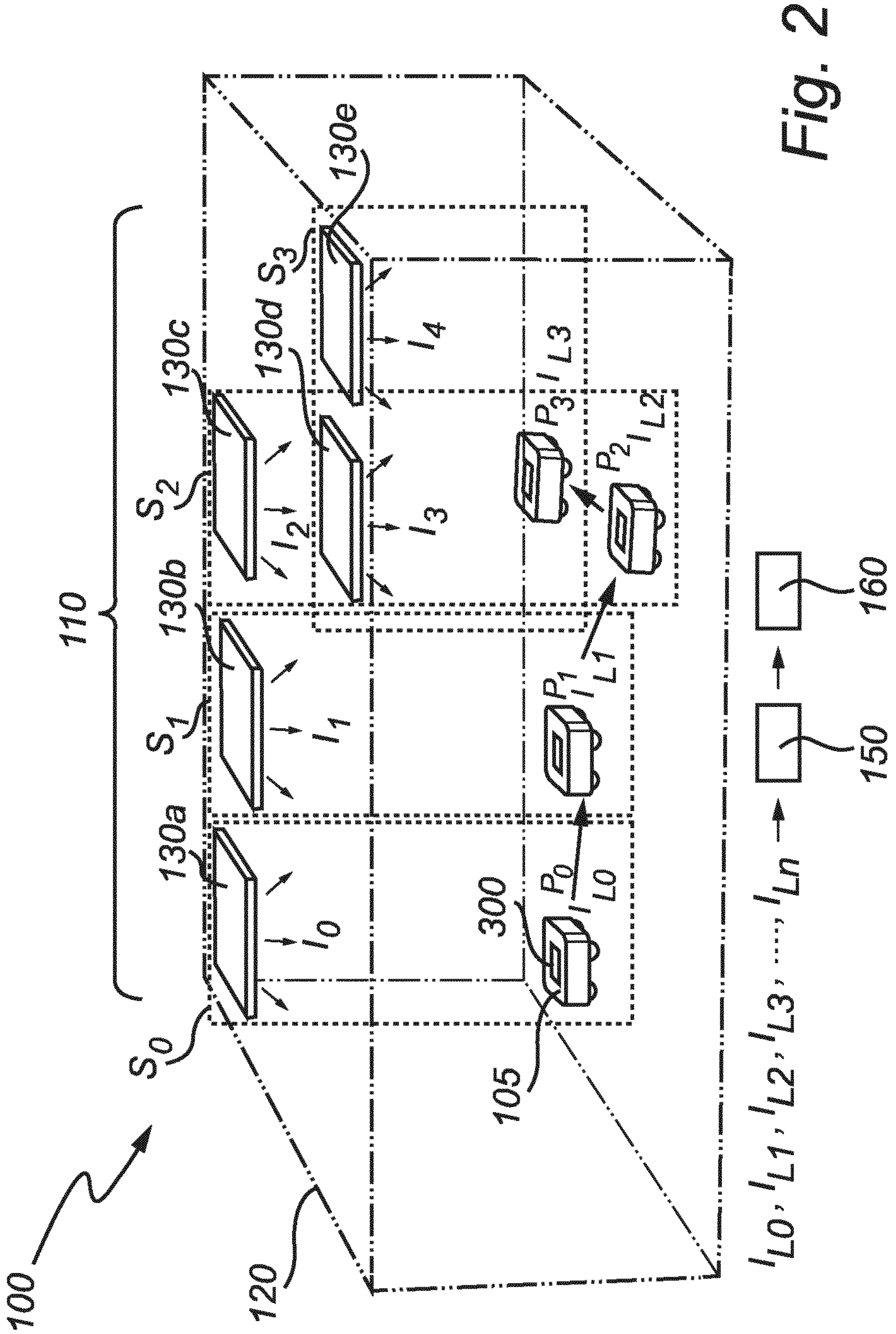

FIG. 2 schematically shows a device 105 for commissioning a lighting system 110 arranged in an indoor space 120, wherein the lighting system 110 comprises a plurality of light sources 130. It will be appreciated that the (operation of the) device 105 has many features in common with the method 100 of FIG. 1, and it is referred to FIG. 1 and the associated text for an increased understanding of the device 105. The device 105 in FIG. 2 is exemplified as a self-propelled unit, robot, or the like, comprising a set of wheels, and a drive unit coupled to the set of wheels, whereby the device is configured to position itself in the indoor space via the wheels and the drive unit. The device 105 is configured to position itself in a position, $P_0$, in the indoor space, determine a subspace, $S_0$, of the indoor space comprising the position, $P_0$, wherein the subspace, $S_0$, comprises at least one light source 130*a* of the plurality of light sources. The device 105 is further configured to set the intensity level, $I_0$, of the at least one light source in the subspace, $S_0$, to an intensity level value, and to measure a light intensity, $I_{L0}$, in the position, $P_0$. The device 105 may comprise light sensor(s), camera(s), interface(s), or the like, configured to measure the light intensity, $I_{L0}$. The device 105 is further configured to, in an iterative manner from i=1, 2, . . . , to n, position itself in a position, $P_i$, in the indoor space 120, determine a subspace, $S_i$, of the indoor space 120 comprising the position, $P_i$, wherein the subspace, $S_i$, comprises at least one light source of the plurality of light sources, set the intensity level, $I_i$, of the at least one light source in the subspace, $S_i$, to a randomly selected intensity level value, measure a light intensity, $I_{Li}$, in the position, $P_i$. As exemplified in FIG. 2, the device 105 is configured to position itself in positions $P_1$, $P_2$, $P_3$, define subspaces, $S_1$, $S_2$, $S_3$, of the indoor space 120 comprising the respective position, $P_1$, $P_2$, $P_3$, wherein the subspace, $S_1$, $S_2$, $S_3$, comprise light source 130*a*, 130*b*, 130*c*, and 130*d,e*, respectively, set the intensity levels, $I_1$-$I_4$ of light sources 130*a-e* and measure the light intensities, $I_{L1}$-$I_{L3}$ in the positions, $P_1$-$P_3$. The device 105 is further configured to register a relation between the measured light intensity, $I_{Li}$, in the position, $P_i$, and the measured light intensity, $I_{Li-1}$, in the position, $P_{i-1}$, to a path register 150, and navigate in the indoor space 120 based on the path register 150. For example, the device 150 may hereby navigate (back) to the (initial/starting) position, $P_0$, based on the path register 150. According to an embodiment, the device 105 may comprise the path register 150, and a processor which is communicatively coupled to the path register, whereby the device 105 is further configured to navigate in the indoor space 120 based on the path register 150. The device may comprise at least one interface 300 configured to set the intensity level, $I_i$, of the at least one light source in the subspace, $S_i$, to a selected intensity level value.

Figure 3:
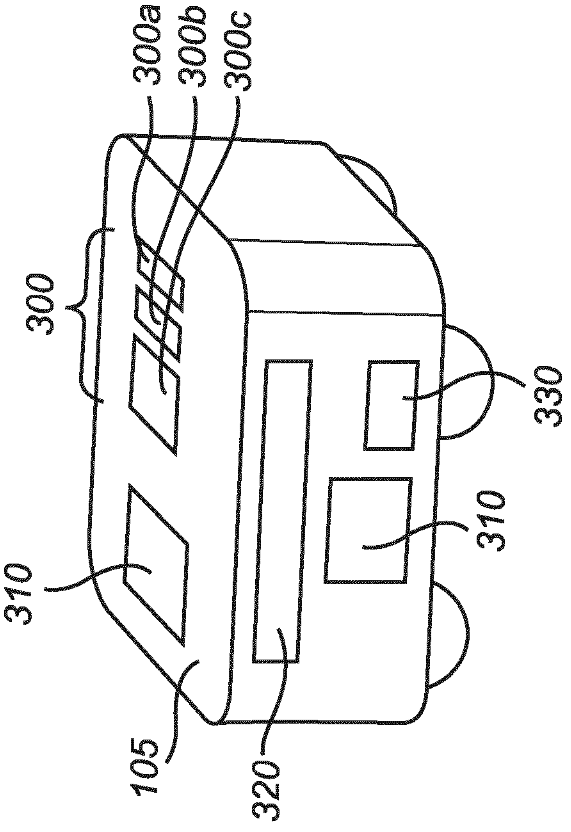

FIG. 3 schematically shows a device 105 for commissioning a lighting system. It will be appreciated that features of the device, and the operation thereof, is described in FIG. 2 and the associated text, and it is hereby referred to FIG. 2 and the text for an increased understanding. The device 105 comprises an interface 300 configured to set the intensity level, $I_i$, of the at least one light source in the subspace, $S_i$, to a randomly selected intensity level value. Here, the interface 300 comprises an infrared (IR) unit 300*a*, a Bluetooth Low Energy (BLE) unit 300*b* and a Zigbee unit 300*c*, but it should be understood that the device 105 may comprise one of more of these units as part of the interface 300. The device 105 further comprises a unit or element 310 comprising light sensor(s), camera(s), and/or interface(s) configured to measure the light intensity, $I_{Li}$. It will be appreciated that the interface 300 and the unit or element 310 may be integrated with each other and/or connected to each other. The device 105 further comprises software 320 and an Ethernet unit 330 for the device's 105 operation and/or communication purposes. The device 105 further comprises the path register 150 comprising (storing) the measured light intensity, $I_{Li}$, in the position, $P_i$.

Figure 4:
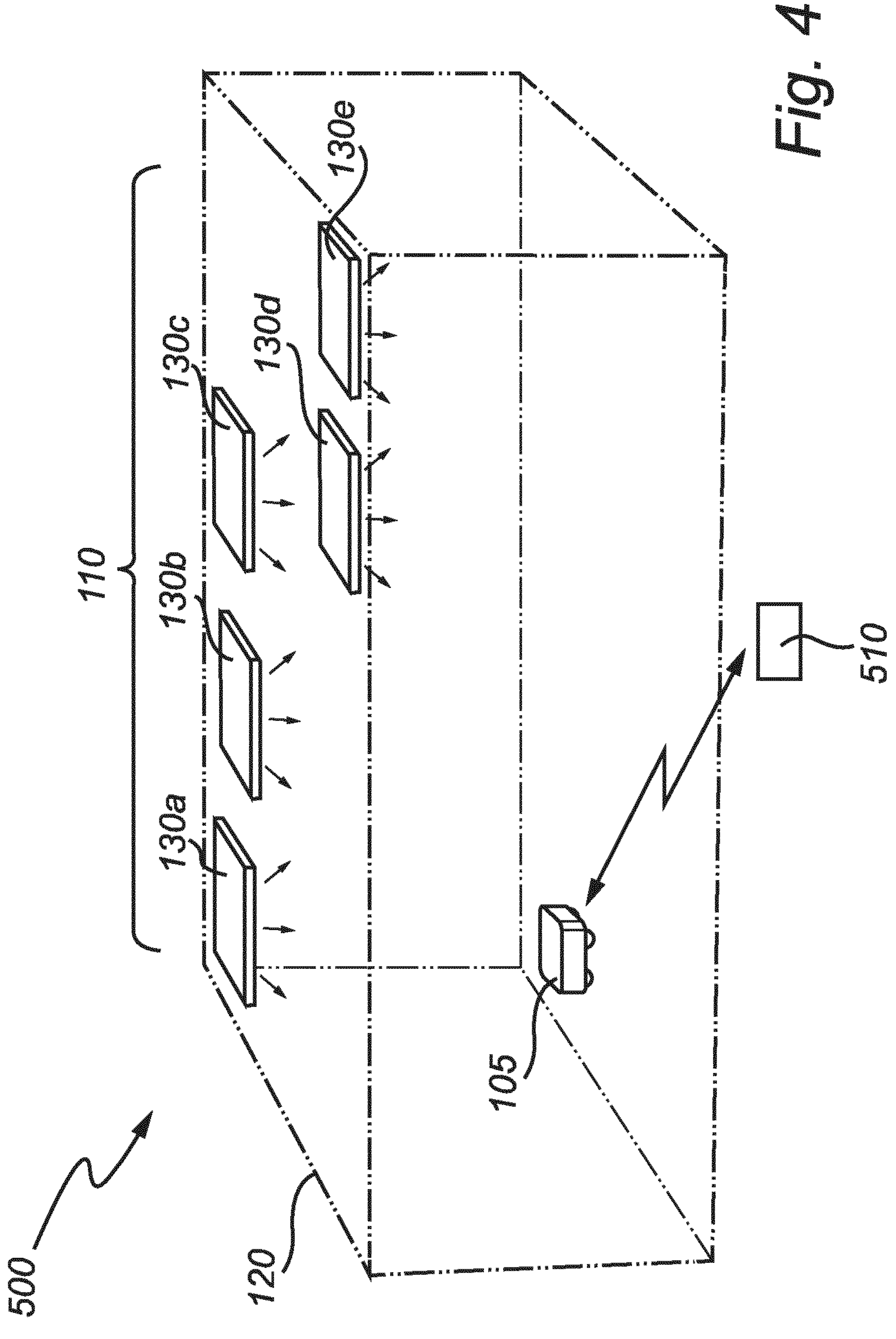

FIG. 4 schematically shows a commissioning arrangement 500 according to an exemplifying embodiment of the present invention. The commissioning arrangement 500 comprises a lighting system 110 arranged in an indoor space 120, wherein the lighting system comprises a plurality of light sources 130*a-e*, and the device 105 for commissioning of the lighting system 110 according to FIG. 2 and the associated text. The commissioning arrangement 500 further comprises a wireless communication system 510, wherein the device 105 is connected to the wireless communication system 510.

The person skilled in the art realizes that the present invention by no means is limited to the preferred embodiments described above. On the contrary, many modifications and variations are possible within the scope of the appended claims. For example, one or more of the light sources 130*a-e*, the device 105, etc., may have different shapes, dimensions and/or sizes than those depicted/described.

The invention claimed is:

1. A method for creating a navigation path for navigation in an indoor space based on measured lighting from a lighting system arranged in the indoor space, wherein the lighting system comprises a plurality of light sources, wherein the method comprises the steps of:

defining a position, $P_0$, in the indoor space, defining a subspace, $S_0$, of the indoor space comprising the position, $P_0$, wherein the subspace, $S_0$, comprises at least one light source of the plurality of light sources, setting the intensity level, $I_0$, of the at least one light source in the subspace, $S_0$, to an intensity level value, measuring a light intensity, $I_{L0}$, in the position, $P_0$, and in an iterative manner from i=1, 2, . . . , to n, defining a position, $P_i$, in the indoor space, defining a subspace, $S_i$, of the indoor space comprising the position, $P_i$, wherein the subspace, $S_i$, comprises at least another light source of the plurality of light sources, setting the intensity level, $I_i$, of the at least one light source in the subspace, $S_i$, to an intensity level value, measuring a light intensity, $I_{Li}$, in the position, $P_i$, and registering and storing a spatial relation between the measured light intensity, $I_{Li}$, in the position, $P_i$, and the measured light intensity, $I_{Li-1}$, in the position, $P_{i-1}$, to a path register, and creating a navigation path in the indoor space based on the path register.

2. The method of claim 1, wherein the step of setting the intensity level, $I_i$, of the at least one light source comprises setting the intensity level, $I_i$, of the at least one light source in the subspace, $S_i$, to a randomly selected intensity level value.

3. The method of claim 1, further comprising:
iteratively performing the steps of the method until the intensity level, $I_i$, of each light source, respectively, of the plurality of light sources has been set.

4. The method of claim 1, wherein the position, $P_i$, in the indoor space is at a floor level of the indoor space.

5. The method of claim 1, wherein
before the setting of the intensity level, $I_i$, of the at least one light source, one of:
the at least one light source is turned off, and
the at least one light source is set to a predetermined intensity level, $I_P$, is fulfilled.

6. A device for creating a navigation path for navigation in an indoor space based on measured lighting from a lighting system arranged in the indoor space-, wherein the lighting system comprises a plurality of light sources, wherein the device is configured to:
position itself in a position, $P_0$, in the indoor space,
determine a subspace, $S_0$, of the indoor space comprising the position, $P_0$, wherein the subspace, $S_0$, comprises at least one light source of the plurality of light sources,
set the intensity level, $I_0$, of the at least one light source in the subspace, $S_0$, to an intensity level value,
measure a light intensity, $I_{L0}$, in the position, $P_0$,
and in an iterative manner from i=1, 2, . . . , to n,
position itself in a position, $P_i$, in the indoor space,
determine a subspace, $S_i$, of the indoor space comprising the position, $P_i$, wherein the subspace, $S_i$, comprises at least another light source of the plurality of light sources,
set the intensity level, $I_i$, of the at least one light source in the subspace, $S_i$, to an intensity level value,
measure a light intensity, $I_{Li}$, in the position, $P_i$, and
register and store a spatial relation between
the measured light intensity, $I_{Li}$, in the position, $P_i$, and the measured light intensity, $I_{Li-1}$, in the position, $P_{i-1}$, to a path register,
and
navigate in the indoor space based on the path register.

7. The device of claim 6, being configured to set the intensity level, $I_i$, of the at least one light source in the subspace, $S_i$, to a randomly selected intensity level value.

8. The device of claim 6, further being configured to set the intensity level, $I_i$, of each light source of the plurality of light sources.

9. The device of claim 6, comprising:
the path register, and
a processor communicatively coupled to the path register, the device further being configured to
via the processor, navigate in the indoor space based on the path register.

10. The device of claim 6, wherein the position, $P_i$, in the indoor space is at a floor level of the indoor space.

11. The device of claim 6, comprising at least one of:
at least one light sensor,
at least one camera, and
at least one interface,
configured to measure the light intensity, $I_{Li}$.

12. The device of claim 6, comprising at least one interface configured to set the intensity level, $I_i$, of the at least one light source in the subspace, $S_i$.

13. The device of claim 6, comprising:
a set of wheels, and
a drive unit coupled to the set of wheels,
whereby the device is configured to position itself in the indoor space via the wheels and the drive unit.

14. Commissioning arrangement, comprising:
a lighting system arranged in an indoor space, wherein the lighting system comprises a plurality of light sources, and
the device of claim 6.

15. The commissioning arrangement of claim 14, further comprising:
a wireless communication system,
wherein the device is connected to the wireless communication system.

* * * * *